(12) United States Patent
Stewart et al.

(10) Patent No.: US 7,107,191 B2
(45) Date of Patent: Sep. 12, 2006

(54) MODULAR ARCHITECTURE FOR OPTIMIZING A CONFIGURATION OF A COMPUTER SYSTEM

(75) Inventors: David Bartholomew Stewart, Cambridge (GB); Efstathios Papaefstathiou, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 692 days.

(21) Appl. No.: 10/138,859

(22) Filed: May 2, 2002

(65) Prior Publication Data

US 2003/0208284 A1    Nov. 6, 2003

(51) Int. Cl.
G06F 17/50    (2006.01)
(52) U.S. Cl. .......................................................... 703/1
(58) Field of Classification Search ................... 703/22, 703/1; 700/29; 716/2
See application file for complete search history.

(56) References Cited

U.S. PATENT DOCUMENTS

| | | | |
|---|---|---|---|
| 5,408,663 A | | 4/1995 | Miller |
| 5,598,532 A | * | 1/1997 | Liron ............................. 703/2 |
| 5,742,587 A | | 4/1998 | Zornig et al. |
| 5,752,002 A | * | 5/1998 | Naidu et al. ................... 703/14 |
| 5,761,684 A | | 6/1998 | Gibson |
| 5,794,005 A | | 8/1998 | Steinman |
| 5,850,538 A | | 12/1998 | Steinman |
| 5,960,181 A | | 9/1999 | Sanadidi et al. |
| 6,014,505 A | * | 1/2000 | Schorn ........................... 716/3 |
| 6,268,853 B1 | | 7/2001 | Hoskins et al. |
| 6,324,495 B1 | | 11/2001 | Steinman |
| 6,366,931 B1 | * | 4/2002 | Borowsky et al. .......... 707/205 |
| 6,556,950 B1 | | 4/2003 | Schwenke et al. |
| 6,577,906 B1 | * | 6/2003 | Hurtado et al. ................ 700/2 |
| 6,925,431 B1 | | 8/2005 | Papaefstathiou |

OTHER PUBLICATIONS

Selic, B.; Moore, A.; Woodside, Prof M.; Watson, B.; Bjorkander, M,; Gerhardt, M.; Petriu, Prof D.; "Response to the OMG RFP for Schedulability, Performance and Time" Jun. 17, 2001; 222 pages.
"Web Services Description Language (WSDL)"; Mar. 15, 2001; 59 pages; http://www.w3.org/TR/wsdl.
Petriu, Dorina C.; Shen, Hui; "Applying the UML Performance Profile: Graph Grammar-based Derivation of LQN Models from UML Specifications"; Feb. 2002; Ontario, Canada; 19 pages.
Leymann, Prof. Dr. Frank; "Web Services Flow Language"; May 2001; 108 pages.
Andradottir; "A Review of Simulation Optimization Techniques"; Proceedings of the 1998 Winter Simulation Conference; pp. 151-158.

(Continued)

*Primary Examiner*—Albert W. Paladini
(74) *Attorney, Agent, or Firm*—Lee & Hayes, PLLC

(57) ABSTRACT

An optimizer optimizes the configuration of a computer system, such as a web farm. The optimizer makes use of a performance simulator that simulates a cluster of machines running a given workload. A modular architecture allows different optimization modules to be plugged into the optimization system. In addition, the modular architecture also interfaces with different simulators through a simulator interface module. The simulator is decoupled from the optimization module. Simulation data may be filtered to provide and store only relevant objective and parameter values. A unique comparison module also guides the optimization module towards the optimum solution, even if no solutions have yet satisfied the objective completely. By caching simulation and/or optimization results (i.e. as opposed to raw simulation output data from the simulator), the simulations from previous simulation runs and different designers may be reused to reduce the time required for each optimization.

41 Claims, 4 Drawing Sheets

OTHER PUBLICATIONS

Azadivar; "Simulation Optimization Methodologies"; Proceedings of the 1999 Winter Simulation Conference; pp. 93-100.

Boesel, et al.; "A Framework for Simulation-Optimization Software"; Technical Report; Department of Industrial Engineering and Management Sciences, Northwestern University; May 1999; 25 pages.

Boesel, et al; "Future of Simulation Optimization"; Proceedings of the 2001 Winter Simulation Conference; pp. 1466-1469.

Chong, et al; "A Framework for Simulation-based Network Control via Hindsight Optimization"; Conference on Decision and Control (CDC), 2000; 6 pages.

Gehlsen, et al.; "A Framework for Distributed Simulation Optimization"; Proceedings of the 2001 Winter Simulation conference; pp. 508-514.

Hardwick, et al; "Modeling the Performance of E-Commerce Sites"; Journal of Computer Resource Management; Winter 2002 Edition; Issue 105; pp. 3-12.

Humphrey, et al; "A Revised Simplex Search Procedure for Stochastic Simulation Response-Surface Optimization"; Proceedings of the 1998 Winter Simulation Conference; pp. 751-759.

Joshi, et al.; "Framework for the Optimization of Discrete-Event Simulation Models"; Proceedings of the 17th ASEM National Conference, Oct. 10-12, 1996; 7 pages.

Neddermeijer, et al; "A Framework for Response Surface Methodology for Simulation Optimization", Proceedings of the 2000 Winter Simulation Conference, pp. 129-136.

Swisher, et al.; "A survey of Simulation Optimization Techniques and Procedures"; Proceedings of the 2000 Winter Simulation Conference; pp. 119-128.

Thompkins; "Policy Driven, Multi-Objective Optimization of Simulated Stochastic Models"; http://www.ncsa.uiuc.edu/TechFocus/Projects/NCSA/PolicyDriven_Multi-Objective_Optimization_of_Simulated_Stochastic_Models.html; 3 pages; last updated Apr. 28, 2004.

Loosley, et al; "E-Commerce Response Time: A Reference Model"; in Proceedings of the Computer Measurement Group's 2000 International Conference (CMG2000); Dec. 2000; pp. 1-16.

Spellmann, et al; "eBusiness Performance: Risk Mitigation in Zero Time"; in Proceedings of the Computer Measurement Group's 2000 International Conference (CMG2000); Dec. 2000; pp. 1-11.

Papaeftstathiou, "Design of a Performance Technology Infrastructure to Support the Construction of Responsive Software", 2000. Ontario Canada.

* cited by examiner

MODULAR ARCHITECTURE FOR OPTIMIZING A CONFIGURATION OF A COMPUTER SYSTEM

RELATED APPLICATIONS

The application is related to U.S. patent application Ser. No. 10/053,731, entitled "EVALUATING HARDWARE MODELS HAVING RESOURCE CONTENTION", and U.S. patent application Ser. No. 10/053,733, entitled "LATE BINDING OF RESOURCE ALLOCATION IN A PERFORMANCE SIMULATION INFRASTRUCTURE", both of which are specifically incorporated herein for all that they disclose and teach.

TECHNICAL FIELD

The invention relates generally to computer system performance simulation, and more particularly to optimizing a computer system configuration using computer system performance simulation.

BACKGROUND OF THE INVENTION

As businesses and consumers continue to flock to the Internet for commercial interaction, design of web-based computer systems, such as "web farms", must satisfy more numerable and restrictive constraints while satisfying increasingly difficult objectives. For example, a proposed web farm may be specified to run an e-commerce site serving 10,000 concurrent users, requiring that the utilization of each server is less that 60% and that the response times users experience be less than 5 seconds. In addition, the design must minimize the number of total servers in the web farm. This information represents a "problem" that a designer must solve (i.e., by designing a computer system configuration to satisfy the problem requirements).

In existing approaches, the design of the resulting web farm is achieved through manual trial-and-error calculations or speculative performance simulations. For example, a designer may change workload and topology parameters of a computer system configuration to vary the number of servers and users, CPU speed, the amount of memory in each server, the secondary storage configuration, etc. and then simulate the configuration with a performance simulator. Such simulations can take a long time to complete (e.g., ranging from a few minutes to many hours per iteration). However, the selection of the configuration variables for each iteration is left to the designer and is often based on the designer's interpretations of one or more previous iterations. Particularly, designers have previously used rules of thumb and speculations based on previous experience to make provisioning decisions. Accordingly, arriving at an optimal solution is risky, time-consuming, manually intensive, and difficult to achieve using most existing approaches.

In other approaches, optimization tools have been offered for use with some specific performance simulation systems to reduce the manual emphasis of the optimization process. Such a tool can support one or more predefined optimization algorithms. However, in some such approaches, each optimization tool has been absolutely dependent on and often integrated into a given simulator, preventing use of the same optimizer and problem specification with multiple and disparate simulators.

Moreover, the various web farm configurations that are simulated may share iterations having common configurations and results. Clearly, it is undesirable to re-simulate such shared iterations for each web farm being designed, but existing approaches do not provide means for reusing previously simulated iterations.

SUMMARY OF THE INVENTION

Embodiments of the present invention solve the discussed problems by providing a modular architecture for optimizing the configuration of a computer system, such as a web farm. The optimizer makes use of a performance simulator that simulates a cluster of machines running a given workload. It should be understood that even a computer system without a web-orientation, such as a local computer system including database servers, print servers, and printers, can be optimized by embodiments of the present invention.

A modular architecture allows different optimization modules to be plugged into the optimization system. In this manner, both ready-made and customized optimization algorithms may be applied to a given configuration problem. In addition, the modular architecture also interfaces with different simulators through a simulator interface module. By decoupling the simulator from the optimization module, a single optimization module can support multiple types of simulators. Likewise, a single problem specification may be used unchanged on multiple types of simulators.

A unique comparison module also guides the optimization module towards the optimum solution, even if no solutions have yet satisfied the objective completely. Furthermore, by caching simulation and/or optimization results (i.e. as opposed to raw simulation output data from the simulator), the simulations from previous simulation runs and different designers may be reused to reduce the time required for each optimization.

In implementations of the present invention, articles of manufacture are provided as computer program products. One embodiment of a computer program product provides a computer program storage medium readable by a computer system and encoding a computer program that optimizes a computer system configuration. Another embodiment of a computer program product may be provided in a computer data signal embodied in a carrier wave by a computing system and encoding the computer program that optimizes a computer system configuration.

The computer program product encodes a computer program for executing on a computer system a computer process for optimizing a computer system configuration is provided. A candidate computer system configuration is generated from a skeleton configuration and a set of one or more parameters that parameterize the skeleton configuration. Simulation data generated by a performance simulator based on the candidate computer system configuration is received. An objective based on one or more selected variables from the simulation data is computed. The objective is compared to a previously computed objective based on a previously simulated computer system configuration to yield an optimum configuration.

In another implementation of the present invention, a method of optimizing a computer system configuration is provided. A candidate computer system configuration is generated from a skeleton configuration and a set of one or more parameters that parameterize the skeleton configuration. Simulation data generated by a performance simulator based on the candidate computer system configuration is received. An objective based on one or more selected variables from the simulation data is computed. The objective is compared to a previously computed objective based on a previously simulated computer system configuration to yield an optimum configuration.

In yet another embodiment of the present invention, a system for optimizing a computer system configuration is provided. An optimizing algorithm module generates a set of one or more parameters. A problem manager generates a candidate computer system configuration from a skeleton configuration and the set of one or more parameters. A comparison module compares an objective based on the candidate computer configuration to a previously computed objective based on a previously simulated computer system configuration to yield an optimum configuration.

These and various other features as well as other advantages, which characterize the present invention, will be apparent from a reading of the following detailed description and a review of the associated drawings.

DETAILED DESCRIPTION OF THE INVENTION

An optimizer optimizes the configuration of a computer system, such as a web farm. The optimizer makes use of a performance simulator that simulates a cluster of machines running a given workload. A modular architecture allows different optimization modules to the plugged into the optimization system. In addition, the modular architecture also interfaces with different simulators through a simulator interface module. By decoupling the simulator from the optimization module, a single optimization module can support multiple types of simulators. Simulation data may be filtered to provide and store only relevant objective and parameter values. A unique comparison module also guides the optimization module towards the optimum solution, even if no solutions have yet satisfied the objective completely. By caching simulation and/or optimization results (i.e. as opposed to raw simulation output data from the simulator), the simulations from previous simulation runs and different designers may be reused to reduce the time required for each optimization.

Figure 1:
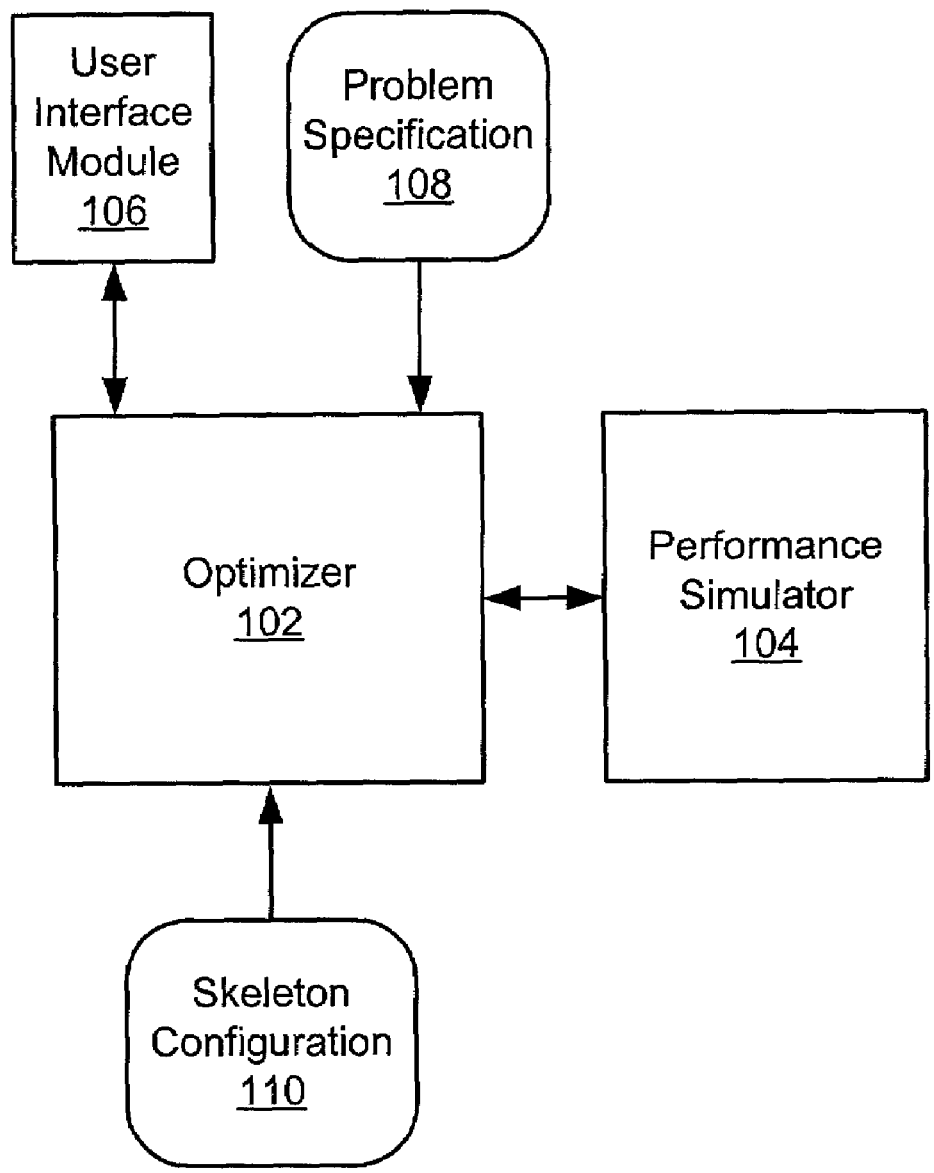
FIG. 1 depicts a computer system configuration optimizer in an embodiment of the present invention.

FIG. 1 depicts a computer system configuration optimizer in an embodiment of the present invention. An optimizer 102 is communicatively coupled to a performance simulator 104 that predicts the performance of the resources within a computer system under defined conditions (e.g., topology and workload). In the illustrated embodiment, the conditions are defined by a topology specification and a workload definition (collectively shown as a skeleton configuration 110), which are iteratively processed by the optimizer 102 for input to the performance simulator 104 for each simulation of the optimization. It should be understood that conditions may be specified by different or additional input information in an alternative embodiment of the present invention.

A topology specification (also called a "resource topology tree") defines the topological relationships among resources in the computer system configuration (e.g., number of servers of various types, the number of users connecting to the servers, the communications links between nodes, the communications bandwidth available between nodes, the number of threads executing in a server, etc.). A workload specification defines the requests or transactions among resources (e.g., a client requests to view a product web page from a web server, the web server accesses a database to access information to be displayed on the web page, etc.).

A problem specification 108 is also input to the optimizer 102 to specify one or more parameters, constraint functions, and optimization functions. A parameter represents a characteristic that can be varied in the configuration during the optimization, including the number of items at each level in the topology hierarchy, the hardware models assigned to a resource in a simulation, and parameters of the workload. Exemplary parameters include the number of web servers, the speed of one or more CPUs, the number of threads running per system, etc. Generally, a constraint represents a limit or threshold for a given parameter, such as input parameters or simulation outputs. A constraint function yields a result indicating whether the constraint has been met. For example, the optimizer 102 may be asked to optimize a computer system configuration such that the utilization of each server in the configuration remains below 60%, wherein 60% is a constraint applied to the utilization parameter of the simulations. The constraint function may yield a TRUE result if the constraint of 60% is met by the simulation iteration and a FALSE result if the constraint is not met.

In contrast, an optimization function generally represents a maximum or a minimum for a parameter sought to be obtained from the optimization, although optimizations functions may optimize to other goals within the scope of the present invention. For example, the optimizer 102 may be asked to optimize a computer system configuration to maximize the number of users supported, to minimize the number of total servers, or to minimize the overall cost of the system configuration. The combination of results from constraint functions and optimization functions is referred to as an "objective".

In addition, constraints may be dependent on other parameter values in the optimization. This is represented by an element of the problem specification 108 called a "variable function". A variable function is an expression of input parameters defined using similar syntax to the objective functions. For example, a first constraint function may be defined as "limiting the number of web servers being between 5 and 10" and a variable function may be used to define a second constraint function as "limiting the number of SQL servers being less than 15 minus the number of web servers". In light of these constraint functions and the variable, the number of SQL servers is constrained relative to the number of web servers.

A user interface module 106 is coupled to the optimizer 102 and acts as an interactive optimization tool for, among other functions, controlling operation of the optimizer 102, specifying input and output files, and displaying optimization output. The user interface module 106 may also include a stepper module (not shown) to automate stepping through simulation iterations with varied parameters. It should also be understood that the user interface module 106 may be embodied by a batch or console interface to allow scripted or command line optimizations.

Figure 2:
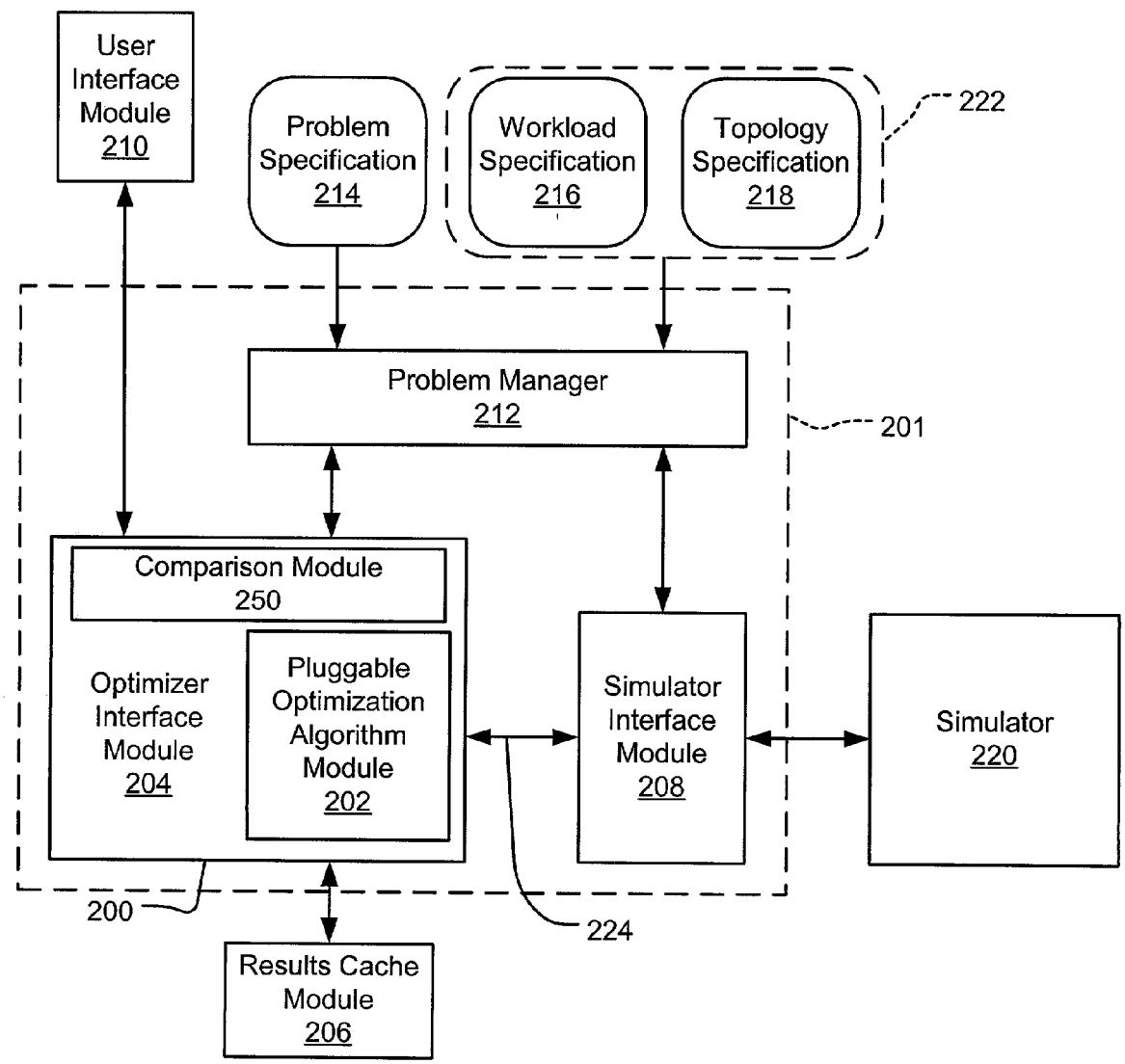
FIG. 2 depicts elements of a computer system configuration optimizer in an embodiment of the present invention.

FIG. 2 depicts elements of a computer system configuration optimizer 201 in an embodiment of the present invention. The optimization module 200 includes an optimizer interface module 204 that allows one or more pluggable optimization algorithm modules 202 to be plugged into the optimization module 200. Such optimization algorithm modules 202 comply with the interface requirements of the optimizer interface module 204 and can therefore be plugged into the optimization module 200 without dependence on the problem specification 214, the results cache module 206, or the simulator 220. The optimization module 200 may also include a pluggable comparison module 250 that compares results for the optimizer interface module 204. This modular architecture allows a designer to use a variety of pre-defined optimization algorithms or to customize a new optimization algorithm for a given task. A user interface module 210 is coupled to the optimization module 200 to allow interactive control of the optimization module 200, to specify input and output files, and to display optimization output.

A simulator 220 represents a performance prediction system, such as that disclosed in U.S. patent application Ser. No. 10/053,731, entitled "EVALUATING HARDWARE MODELS HAVING RESOURCE CONTENTION", and U.S. patent application Ser. No. 10/053,733, entitled "LATE BINDING OF RESOURCE ALLOCATION IN A PERFORMANCE SIMULATION INFRASTRUCTURE". Generally, a simulator 220 receives topology data and workload data to simulate the performance of a computer system configuration. It should be understood that the modular architecture employed in the illustrated embodiment allows support for many different types of performance prediction systems.

A problem specification 214 that defines the constraint functions and optimization functions of the optimization is input to a problem manager 212, which is typically embodied by one or more objects. In one embodiment, the problem specification 214 is in XML (extensible Markup Language) format and may be specified by multiple files, although other formats are contemplated within the scope of the present invention. An exemplary problem specification is listed below (an associated exemplary XML script schema is listed in Appendix A):

```
<?xml version="1.0" standalone="no" ?>
<optimization_problem xmlns="x-schema:optimization_problem.xml">
    <!-- Objective: Minimize the total delay over the entire system -->
    <objective minmax="min">
        <function>
            <fevent device="WebServer[?].?"
            interface_type="common"
            interface_name="" variable_name="totaldelay"
            minmaxmean="mean" />
        </function>
    </objective>
    <!-- Constraint: Constraint the CPU utilization to 80% -->
    <constraint constraint="le">
        <function>
            <frct device="Webserver[?].?" name="cpu" view="CPU
            Util. (%)"
            minmaxmean="mean" />
        </function>
        <function>
            <fconstant>80</fconstant>
        </function>
    </constraint>
    <!-- Parameter: Alter the CPU models -->
    <parameter name="cpu_model">
        <value>CpuModel:Pentium 450Mhz</value>
        <value>CpuModel:Pentium 800Mhz</value>
    </parameter>
    <!-- Parameter: Alter the number of webservers -->
    <parameter name="webserver_count">
        <value>1</value>
```

-continued

```
        <value>2</value>
        <value>3</value>
        <value>4</value>
        <value>5</value>
    </parameter>
</optimization_problem>
```

Problem Specification Sample

The problem specification sample listed above defines the version of the problem statement and indicates that a schema (see Appendix A) is required to compile the problem specification in line 1. Line 2 identifies a schema file associated with the problem specification sample. The schema file defines the syntax of elements and keywords relevant to the optimization specification requirements.

Lines 3–10 define an optimization function for minimizing the total delay over the entire system, as indicated by the comment in line 3. In one embodiment of the present invention, delay information is obtained from events lists, which are described in more detail in U.S. patent application Ser. No. 10/053,731, entitled "EVALUATING HARDWARE MODELS HAVING RESOURCE CONTENTION", and U.S. patent application Ser. No. 10/053,733, entitled "LATE BINDING OF RESOURCE ALLOCATION IN A PERFORMANCE SIMULATION INFRASTRUCTURE". Lines 6–8 define an optimization function, including several attributes including an associated device, an associated interface type, an associated interface name, an associated variable name, and an associated "minmaxmean" attribute. The function ƒevent is specified in the sample, designating that the function combines information relating to the event lists that match the associated device. Other exemplary functions are also supported, including without limitation ƒconstant, ƒstring, ƒrct, ƒparameter, ƒtable, and binaryop. Descriptions of the exemplary functions are listed below:

| Function Name | Type and Attributes | Description |
| --- | --- | --- |
| fconstant | type: float | Defines a floating point constant value to be used in the function |
| fstring | type: string | Defines a string value to be used in the function |
| frct | attributes: device, name, view | Combines data from fields of resource contention timelines associated with the device; the name and view attributes specify the RCT and field to be used in the function |
| fevent | attributes: device, interface_type, interface_name, variable_name | Combines data from event lists associated with the device. Attributes specify the input parameter or the simulation output variable provided by the simulator. |
| fparameter | function: string->string | Value of an input parameter |
| ftable | function: string->string | Defines a transformation of the values from a function into a set of strings |
| binaryop | function: float->float | Performs an arithmetic operation on two functions values (e.g., +, -, *, /) |

The associated device in the sample specifies "WebServer[?].?" as the device to be monitored by the optimization function. The "[?]" represents a wildcard indicating that there may be multiple web servers included in the computer system configuration and that all such web servers are to be considered by this optimization function. The second "?", which follows the period, represents a wildcard designating that all resources at the next lower level of each web server is also to be considered by this optimization function. In an exemplary resource topology, this next lower level to the web server is likely to be one or more CPUs for each web server. Therefore, in the exemplary resource topology, the second question mark denotes events lists from all such CPUs are to be considered when computing this optimization function.

Lines 11–20 define a constraint on CPU utilization of all the web servers in the computer system configuration. In one embodiment of the present invention, utilization information is obtained from resource contention timelines or RCTs, which are described in more detail in related application U.S. patent application Ser. No. 10/053,731, entitled "EVALUATING HARDWARE MODELS HAVING RESOURCE CONTENTION". The function is defined using the $frct$ element, described in the table above. The "constraint='le'" statement represents a "less than or equal" constraint, although other constraints are also supported, such as "less than", "greater than or equal", and "greater than". The device attribute identifies the device or devices in the configurations that contribute to the function result. The name attribute specifies the name of the RCT used in the function. The view attribute specifies the name of the RCT field to be used in the function. The minmaxmean attributes specify that the nature of the RCT information to be used by the function. In the sample, the "mean" CPU utilization percentage from all CPU RCTs of all web servers in the configuration is to be kept below the 80% value specified in line 18.

Lines 21–25 define a parameter for altering the CPU models used in the optimization, as indicated by the comment on line 21. Line 22 specifies the parameter name, $cpu_{13}$ model, and lines 23–24 list the possible parameter values. Based on the parameter definition in the sample, during the optimization, the problem manager 212 can vary the hardware models used to model the CPUs of the various servers in each simulation iteration between a 450 Mhz model and an 800 Mhz model (e.g., the CPU speeds of either 450 Mhz or 800 Mhz will be used in a simulation). The parameter name identified in the problem statement corresponds to a parameter name identified in the skeleton configuration.

Lines 26–33 define another parameter. This parameter, named webserver_count, may have values between 1 and 5, as specified by lines 28–32. Accordingly, based on the parameter definition in the sample, the problem manager 212 can vary the number of web servers in the computer system configuration between 1 and 5 for each simulation iteration.

In addition, a skeleton configuration 222 is input to the problem manager 212 in one embodiment of the present invention. The skeleton configuration 222 includes a workload specification 216 and a topology specification 218, although configuration data may be represented by other forms of data. The "skeleton" term connotes that the configuration files may be parameterized in that they contain parameter names for some configuration features (e.g., NumWebServers=the number of web servers). Therefore, the optimization module 200 works with the problem manager 212 to vary these parameters within the framework of the specified topology and workload to optimize the configuration. Each iteration of a parameterized configuration generated by the problem manager 212 based on a proposed list of parameters specified by the optimization module 200 is referred to as a "candidate" configuration. The candidate configuration is input to the simulator 220, through the simulation interface module 208, for simulation.

The optimization algorithm module 202 implements one or more optimization algorithms within a set of predefined interfaces with the optimizer interface module 204. The optimizer interface module 204 acts as an intermediary between the optimization algorithm module 202 and each one of the results cache 206, the simulator interface module 208, the user interface module 210, and the problem manager 212. Prior to the first simulation run, the optimization algorithm module 202, through the optimizer interface module 204, queries the problem manager 212 to determine the number of parameters and the number of possible values for each parameter.

During an optimization run, the optimization module 200 specifies a new parameter set to use in the next simulation iteration and passes the parameter list to the problem manager 212.

For example, the optimization module 200 may specify an ordinal value associated with a given parameter (e.g., "the fifth possible value of parameter NumWebServers"), which the problem manager 212 uses to select appropriate parameter values for inclusion into the next iteration of a candidate configuration. In one embodiment, the problem manager 212 uses its inputs and the parameter list received from the optimization module 200 to return a workload specification and a topology to the optimization module 200 having parameter values for the next simulation iteration.

After the problem manager 212 is created, it registers its interest in various parameters with the simulator interface module 208. After a simulation iteration is complete, the simulation variables in which the problem manager 212 expressed interest are returned to the problem manager 212 from the simulator 220 via the simulator interface module 208. The simulation variable values are then used to compute optimization functions and determine whether constraints are met in a given simulation iteration.

One relevant advantage to an embodiment of the present invention is the "filtering" of simulation data (e.g., simulation variable values) generated by the simulator, which can be on the order of gigabytes in size, into parameter sets and objectives, which can be on the order of mere bytes. This filtering reduces the generated simulation data into a manageable set of results that can be cached and quickly communicated between geographically separated locations. By expressing interest in a subset of variables, the problem manager 212 greatly reduces the size of the communicated simulation data. Furthermore, the use of these variable values to compute the optimization function and constraints can further reduce the size of the data communicated to the optimization module 200.

The simulator interface module 208 separates the optimization module 200 from the complexities of the real interface to the simulator 220. A different simulator interface module can be developed for each simulator that may be used in the optimization system. Each simulator interface module 208 shares a predefined interface 224 with the optimization module 200, regardless of the underlying implementation of simulator 220. In this manner, the optimization module 200 can be used with a different simulator without being changed. Instead, the simulator interface module 208 is replaced with a different simulator interface module that supports the different simulator. It should be understood that the replacement simulator interface module also complies with the predefined interface 224 supported by the optimization module 200. Methods of an exemplary predefined simulation interface are described below.

A results cache 206, which may be implemented as one or more objects, stores parameter sets and objectives of previous simulations. It is expected that individual optimizations at some point will propose simulation of matching configurations and parameter sets. For example, a single designer may attempt to optimize a customer's web farm using different objectives (e.g., one to minimize cost, another to maximize the number of users supported, and yet another to minimize total delay). However, the same parameter sets may be specified by the optimization algorithm 202 for each progressive optimization. As such, the results cache 206 stores results from past simulations, which the optimization module 200 may identify before simulating. As a result of this identification, the optimization module 200 may retrieve the objective corresponding to the current parameter set from the results cache 206 for use in comparing objectives. In this manner, the previously computed objective is reused and an entire simulation and objective computation may be bypassed, thereby increasing performance of subsequent optimization runs.

In an alternative embodiment, the matched parameter set itself (i.e., with parameter values) may be returned (instead of the objective) from the results cache 206 to the optimization module 200. The optimization module 200 passes the parameter set to the problem manager 212. The problem manager 212 uses the cached parameter set to compute a new objective, which is returned to the optimization module 200 for comparison.

It should be understood that results from the results cache 206 may contain simulation results (e.g., parameter values and/or objectives) from simulations of unrelated configurations. For example, different designers may store their results in a common results cache, which may be locally or remotely accessible. Over time, the results cache may grow to include overlapping simulation results that overlap with the current optimization scenario (i.e., results sharing the same parameters and the same skeleton topologies). In such cases, the results cache may be used by the optimization modules of these unrelated configurations to reuse previously simulated results.

The modular architecture of the optimization system allows multiple optimization algorithms to be employed by a designer. Any optimization algorithm module that complies with the predefined interface of the optimization interface module may be used. There are a number of optimization algorithms that may be implemented in an optimization algorithm module.

A discussed, an objective in one embodiment of the present invention includes both an optimization function and a constraint function, although objectives having no constraints are also contemplated within the scope of the present invention. An objective function $g(x)$ may be represented algebraically by:

$$g(x) = f(x)\varepsilon^n + \sum_{i=1}^{n} (c_i(x) - l_i)\varepsilon^{i-1}$$

wherein x represents the vector of input parameters, $f(x)$ represents an optimization function, $c_i(x)$ represents a set of constraint functions where $c_i(x) \leq l_i$, $\varepsilon$ represents an infinitesimally small number, and i=1 $\wedge$ n.

Some possible optimization algorithms are described below:

1. Hill Climbing
   a. Basic Hill Climbing: The algorithm starts with a single configuration, evaluates adjacent configurations to estimate the gradient at the first configuration, then "climbs the hill" toward the better solution. Gradients can also be estimated using "infinitesimal perturbation analysis" (i.e., changing the parameters slightly and determining the change's effect on the output).
   b. Simulated Annealing: This algorithm is similar to Basic Hill Climbing, but includes going "downhill" at times so as to avoid resolving on a local optimum and missing the global optimum. The probability of going uphill is reduced as the simulations progress. This method is also called the "Metropolis Algorithm" and requires a large number of simulation iterations to ensure a good solution.
   c. Response Surface Methodology (RSM): The objective function is modeled, typically planar or quadratic, from some regression experiments. The minima or maxima of this model are calculated, or the gradient is calculated with a linear model and a certain distance along the gradient is used to get a new configuration point. If a gradient is used, then the highest slope is followed until a maximum or a minimum is reached. Simulations are performed around the new configuration point to create a new surface. When the optimum solution is close, higher order polynomials may be used to obtain more precision in the optimization.
   d. One parameter at a time: One parameter of the parameter set is changed at a time until changes to that parameter cause no improvements. Then, another parameter is varied under the same restriction until no more improvement is detected. This operation is repeated with different parameters until the optimization is terminated.

2. Random Search:

This algorithm selects two configurations, executes the simulation of each configuration, and compares the results. A counter associated with the better configuration is incremented. A new, randomly selected configuration replaces the worse configuration and a simulation is run on the new configuration. The results of the better configuration from the previous comparison and the results of the new configuration are compared. The compare-increment-replace operation is repeated until the optimization process is terminated. After termination, the configuration with the highest counter value is considered the optimum solution.

3. Tabu Search:

This algorithm starts with simulation of a single "starting" configuration. Next, neighboring configurations are simulated. The configuration having the best-simulated result is used as the next "starting" point. What is "best" is determined by a comparison function and may involve both optimization function results and constraint indicators. In addition, certain solutions are defined as "taboo" or "banned", in that they are not candidates for the next move. Banned configurations are defined by a taboo function that may change with the number of iterations completed. Therefore, some configurations that were previously banned may become available later. The optimization process may be terminated after a certain number of iterations that do not result in improvement in the objective.

4. Simplex Search:

In this algorithm, a simplex of the simulation results of a set of multiple configurations, including extreme points. The configuration having the worst simulated result is dropped from the set, replacing it with its reflection through the centroid of the set of multiple configurations or with a similar point based on a predefined set of rules.

5. Genetic Algorithm:

In this algorithm, a set of multiple configurations is selected. One or more configurations having the worst simulated results are removed and replaced with mutations or a combination of configurations with better-simulated results.

6. Relevance Vector Machine (or Support Vector Machine):

In this algorithm, the problem is modeled as a linear combination of basis functions with noise. The noise is modeled by a distribution function, such as a zero-mean Gaussian distribution, with Gamma-distributed variance. The algorithm weights the basis functions so that the combination fits a training data set.

7. Evaluate All Possible Solutions

This algorithm performs a brute force optimization by simulating all possible configurations, based on variations of all parameters. The configuration having the best solution, among the solutions of all simulated configurations, is regarded as the best configuration.

Figure 3:
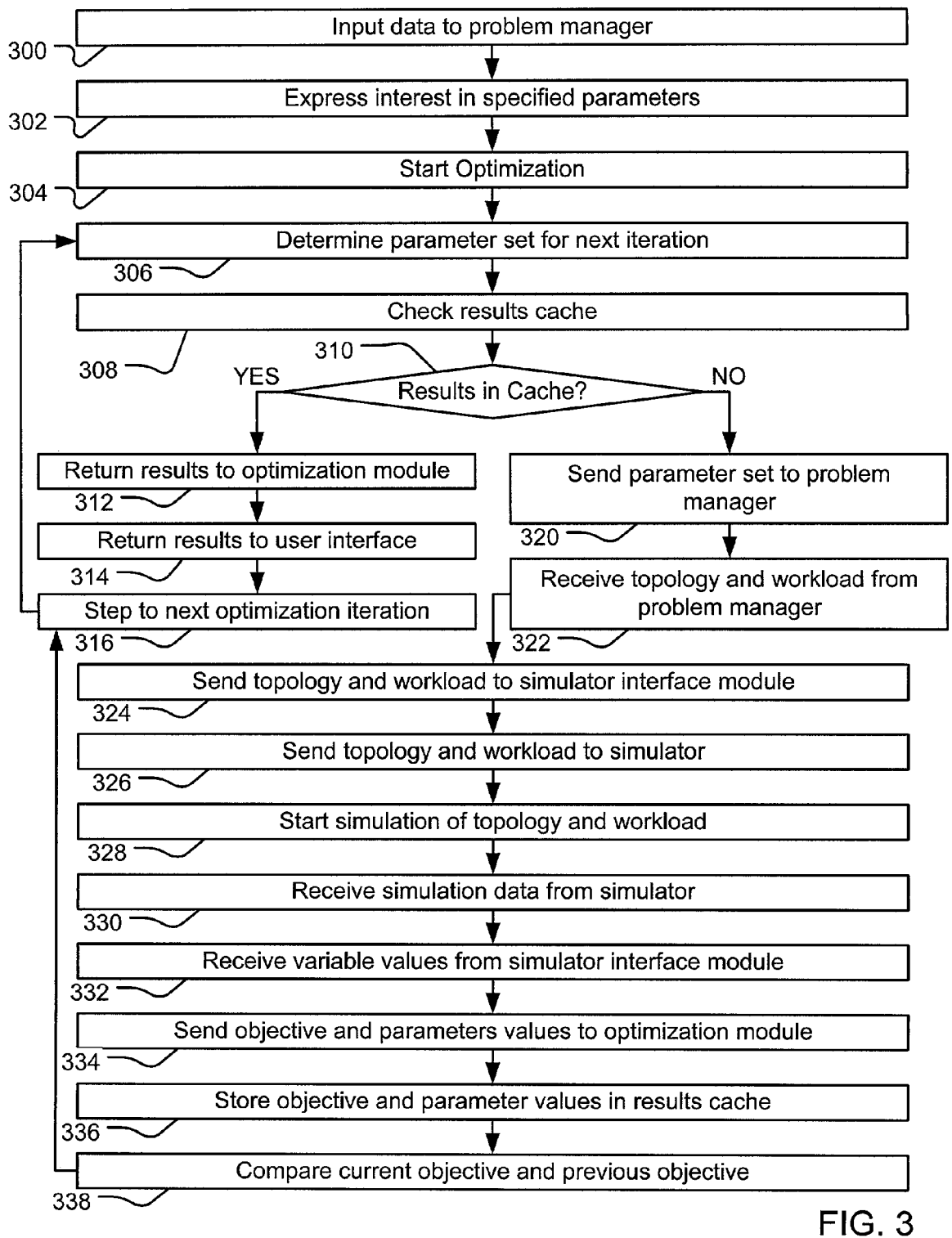
FIG. 3 illustrates operations for optimizing a computer system configuration in an embodiment of the present invention.

FIG. 3 illustrates operations for optimizing a computer system configuration in an embodiment of the present invention. An initialization operation 300 creates the problem manager and inputs data thereto, such as a problem specification, a workload specification, and a topology specification. It should be understood, however, that the data input to the problem manager may be allocated to various files or other input formats. In addition, other modules may be initialized in this initialization operation 300, including without limitation a simulator interface module, an optimizer interface module, and one or more optimization algorithm modules.

It is assumed that an initial configuration has been input to the optimization module. In one embodiment, the initial configuration is provided, in part, by the problem specification. In addition, an initial workload specification and topology specification may be communicated to the optimization module prior to the first simulation iteration (such as in the initialization operation 300) to provide a starting point for the optimization. Alternatively, the optimization module may request the number of parameters and the number of possible values for each parameter. The optimizer may choose the initial parameter values arbitrarily or via a predefined algorithm to satisfy the constraints specified in the problem specification, such as in determining operation 306. Alternatively, interactive user input or other input may specify or "seed" the initial parameter values for the first simulation. In yet another embodiment, the optimization module requests a workload and a topology from the problem manager, without specifying initial parameter values. In this embodiment, the problem manager may return a workload and a topology having parameters satisfying the constraints. Thereafter, the optimization module determines the parameter values to be used for each iteration.

Upon creation, the problem manager evaluates the problem specification and expresses interest in one or more specified variables of the simulation data by communicating with the simulator interface module in an interest operation 302. In this manner, the simulator interface module can calculate the variable values required by the problem manager without the problem manager requiring any specific knowledge of the simulator used in the optimization process. That is, the implementation details of the simulator used in the optimization is encapsulated in the simulator interface module, in accordance with the modular architecture. After each simulation iteration, the problem specification can retrieve (or be sent) the simulation result for each variable (see receiving operation 332). Therefore, instead of passing simulation data, which is typically on the order of gigabytes in size, the simulator interface module filters unneeded data from the simulation data and passes on the variable values in which the problem manager expressed interest, which is likely to be on the order of bytes in size.

A start operation 304 starts a series of optimizing simulation "steps". In one embodiment, a user interface module repeatedly issues "step" commands and receives responsive results containing the parameter values and the objective. With each step command received from a user interface module, the optimizing algorithm computes the parameter set for the next simulation iteration, in a determining operation 306.

Thereafter, in a checking operation 308, the optimization module checks the results cache to determine whether the same simulation had been run before. In this checking operation, the "same simulation" may be determined by comparing parameters of a previously simulated configuration (which are stored in the results cache) with the parameter set proposed by the optimization algorithm.

If the same simulation is found in the result cache, processing proceeds to a return operation 312 via a decision operation 310. The return operation 312 returns the cached results from the results cache to the optimization module. In one embodiment, the results cache may include parameter identifiers or names, their respective values, and objectives, although more or less information is contemplated within the scope of the present invention. The results may then be returned to the user interface module in a returning operation 314. Processing then returns via the "step" operation to the determining operation 306 to begin the next simulation iteration.

In an alternative embodiment, the results cache may not include the objectives. Instead, returned parameter values are passed to the problem manager, which uses the parameter values to compute constraint functions and optimization functions. The results (e.g., whether a parameter satisfies a constraint and the computed function result) are then passed back to the optimization module, which returns the parameters and objectives to the user interface module. The parameters are substituted into corresponding simulator input variables for the simulation.

If the same simulation is not found in the results cache, the decision operation 310 directs processing to an output operation 320, which passes the parameter list to the problem manager to define the configuration for the next simulation iteration. In a receiving operation 322, the optimization module receives a new configuration from the problem manager, wherein the new configuration includes the parameters as indicated by the optimization module in output operation 320. In one embodiment of the present invention, the configuration is embodied by a topology specification and a workload specification (generated from the skeleton configuration by the problem manager), although the configuration in other embodiments may take other forms within the scope of the present invention.

An output operation 324 sends the configuration to the simulator interface module through a predefined interface. An output operation 326 sends the configuration to the simulator. A starting operation 328 initiates the simulation of the configuration in a simulation iteration. A receiving operation 330 receives the resulting simulation data of the simulation iteration from the simulator. In a receiving operation 332, the problem manager receives variable values for those parameters in which it expressed interest in the interest operation 302.

In an objective operation 334, the problem manager computes the optimization function and evaluates the constraints using the received variable values. In the objective operation 334, the problem manager also sends the parameter values, the result of optimization function, and an indication of which constraints were met to the optimization module. The optimization module stores the objective (i.e., the function result and the constraint indications) and the parameter values in the results cache in a storing operation 336. In a comparison operation 338, the current objective is compared with a previously computed objected and the best objective is returned to the user interface module (although this returning operation may be delayed until the optimization run is terminated, so that only the final results are returned to the user interface module).

The modular architecture of the optimization system allows pluggable optimization algorithm modules and interchangeability of simulators and configuration specifications. In one embodiment, the modular architecture is implemented using the following interfaces, although it should be understood that other interface implementations are contemplated within the scope of the present invention.

Pluggable Optimization Algorithm Module Interface: This interface defines exemplary methods supported by a pluggable optimization module for communicating with the optimizer interface module.

optimization_algorithm->initialize(algorithm interface, simulator interface): initializes the optimization algorithm; instructs the optimization algorithm module to use the specified algorithm interface and simulator interface module optimization_algorithm->step( ): requests the optimization algorithm module to proceed with the next simulation iteration; typically called by a user interface or stepper module optimization_algorithm->best( ): returns the best solution found so far by the optimization algorithm; typically called by a user interface or stepper module Optimizer Interface Module Interface: This interface defines exemplary methods supported by an optimizer interface module for communicating with the problem manager, the user interface module, the results cache, and the simulator interface module.

optimizer_interface->initialize(problem manager, simulator interface, results cache): initializes the optimizer interface module; instructs the optimizer interface module to use the specified problem manager, simulator interface module and results cache.

optimizer_interface->run(parameter set): runs a simulation through the previously specified simulator interface module, if necessary, to get the results to be associated with the parameter set. Alternatively, if the parameter set has already been cached, the optimizer interface module obtains the cached objective already associated with the parameter set. In more detail, this method performs the following steps:
1. objective=results_cache lookup(parameter set)
2. If it's not in the result cache:
   a. configuration=problem_manager get_configuration (parameter_set).
   b. simulator_interface set_configuration(configuration)
   c. simulator_interface run(number of simulations)
   d. objective=problem_manager get_objective( )
   e. simulator_interface clear( )
   f. results_cache add(parameter set, objective)

optimizer_interface->compare(objective1, objective2): compares two objectives (including function result and constraint indications) after a simulation to determine which parameter set produced the best result; note that the objective includes Problem Manager Interface: This interface defines exemplary methods supported by a problem manager for communicating with the optimizer interface module during initialization.

optimizer_interface->get_number_of_parameters( ): returns the number of parameters in the problem specification optimizer interface->get_number_of_parameter_values (parameter number): returns the number of possible values for the parameter specified.

optimizer_interface->initialize(problem specification, simulator interface): initializes the problem manager to read the configuration files. The problem manager then registers interest in various simulation parameters through the specified simulator interface module using the method "register-_interest" of the specified simulator interface module.

optimizer_interface->get_configuration(parameter set, skeleton configuration): returns the configuration of the problem for a given set of parameters. In one embodiment, the configuration is the workload specification and the resource topology tree. The problem manager is independent of the details of the configuration files.

optimizer_interface->get_objective(parameter set): returns the objective (the constraint and objective function values) for the problem by calculating things from the results, which it extracts with get_value of the simulator interface module.

Results Cache Interface: This interface defines exemplary methods supported by the result cache module for communicating with the optimizer interface module.

results_cache->initialize(previously generated parameter sets and results): initializes the results cache to contain some previously generated parameter sets and results results_cache->lookup(parameter set): returns the results for a given input parameters set results_cache->add(parameter set, results): adds some results to the results cache for a given input parameter set Simulator Interface Module Interface: This interface defines exemplary methods supported by a simulator interface module for communicating with the optimizer interface module and a problem manager. The interface between the simulator interface module and the simulator is left to the developer and depends on the requirements of the individual simulator.

simulator_interface->initialize(skeleton configuration, whatever a particular simulator needs): initializes the interface. The skeleton configuration is linked to the problem: it is a normal simulator configuration, but various parameters have been replaced with the parameter names they are linked to in the problem. The problem manager later replaces these with particular values to create valid configurations.

simulator_interface->register_interest(output variable name): This method is called by the problem manager (after the problem manager is created) for each of the simulation variables it is interested in. The method returns an identifier that is used after the simulator is run to get to an individual simulation variable value with "get_value".

simulator_interface->set_configuration(configuration): This method sets the configuration for the simulator to use, after the configuration is defined by the problem manager and passed to the optimization module.

simulator_interface->run(number of simulations): This method runs a number of simulations with the current configuration, after this "get_value" is called.

simulator_interface->get_value(output variable id): This method gets the value of the given output variable, this is called each time the problem manager needs to read a result. After the values are extracted "clear" is called.

simulator_interface->clear( ): This method clears the current set of results and configuration from the simulator.

The optimization module includes a comparison module that implements the comparison of objectives received from the problem manager. Based on these comparisons, the optimization algorithm module determines which parameter set is to be specified for the next iteration and which simulation result to maintain as the "best" result after each simulation iteration. Typically, but not always, the parameter set chosen for the next simulation is based on the parameter set that yields the best objective. Which solution is deemed the best of the evaluated solutions is determined by the comparison module. The comparison module is shown in FIG. 2 as integrated with the optimizer interface module 204, although in alternative embodiments, the comparison module may be integrated within the optimizer algorithm module 202 or may be implemented in a separate module.

The objective output by the problem manager to the optimization module encapsulates the results of a set of simulation runs for a given parameter set. In one embodiment, the objective includes: (1) the result value of the optimization function (e.g., total number of web servers equals 12); and (2) for each constraint, (a) the constraint threshold value, (b) the constraint function result, (c) whether the constraint is met, and (d) the difference between the values of (a) and (b).

When comparing two solutions, a solution that satisfies the specified constraints and has a better optimization function result is deemed the "best" solution. However, it is possible that neither solution will satisfy all of the constraints. For example, if the optimization function defines a minimization of the total cost of a system, a first constraint function defines a mean server utilization of below X %, and a second constraint function defines a total delay below Y seconds, a pair of configuration simulations may yield solutions in which each solution fails to meet at least one constraint. For this example, assume that a first configuration simulation fails to satisfy the mean server utilization constraint (i.e., mean server utilization is greater than X %) and that a second configuration simulation fails to satisfy the total delay constraint (i.e., total delay is greater than Y seconds). A unique comparison algorithm determines the best, non-constraint-conforming objective to select as the "best" intermediate solution to lead to the next simulation iteration.

In one embodiment of the present invention, the comparison module employs ordered constraints, giving one constraint function priority over another. In this manner, the solution satisfying the highest priority constraint or constraints is deemed the best solution (assuming that neither solution satisfies all constraints). In an alternative embodiment of the present invention, the comparison module selects the configuration that satisfies the most constraints. In yet another embodiment, the comparison selects the configuration that fails to satisfy the highest priority constraint by the least margin. If both configurations satisfy the highest priority constraint or fail to satisfy the highest priority constraint by the same margin, then the comparison module works down the priority list until the tie is broken. It should be understood, however, that these comparisons are used to establish confidence in intermediate solutions and do not result in themselves as in a optimized solution. These intermediate solutions are used to yield even minor improvements solutions generated by the optimization algorithm, thereby improving the resolution speed of the optimization.

Figure 4:
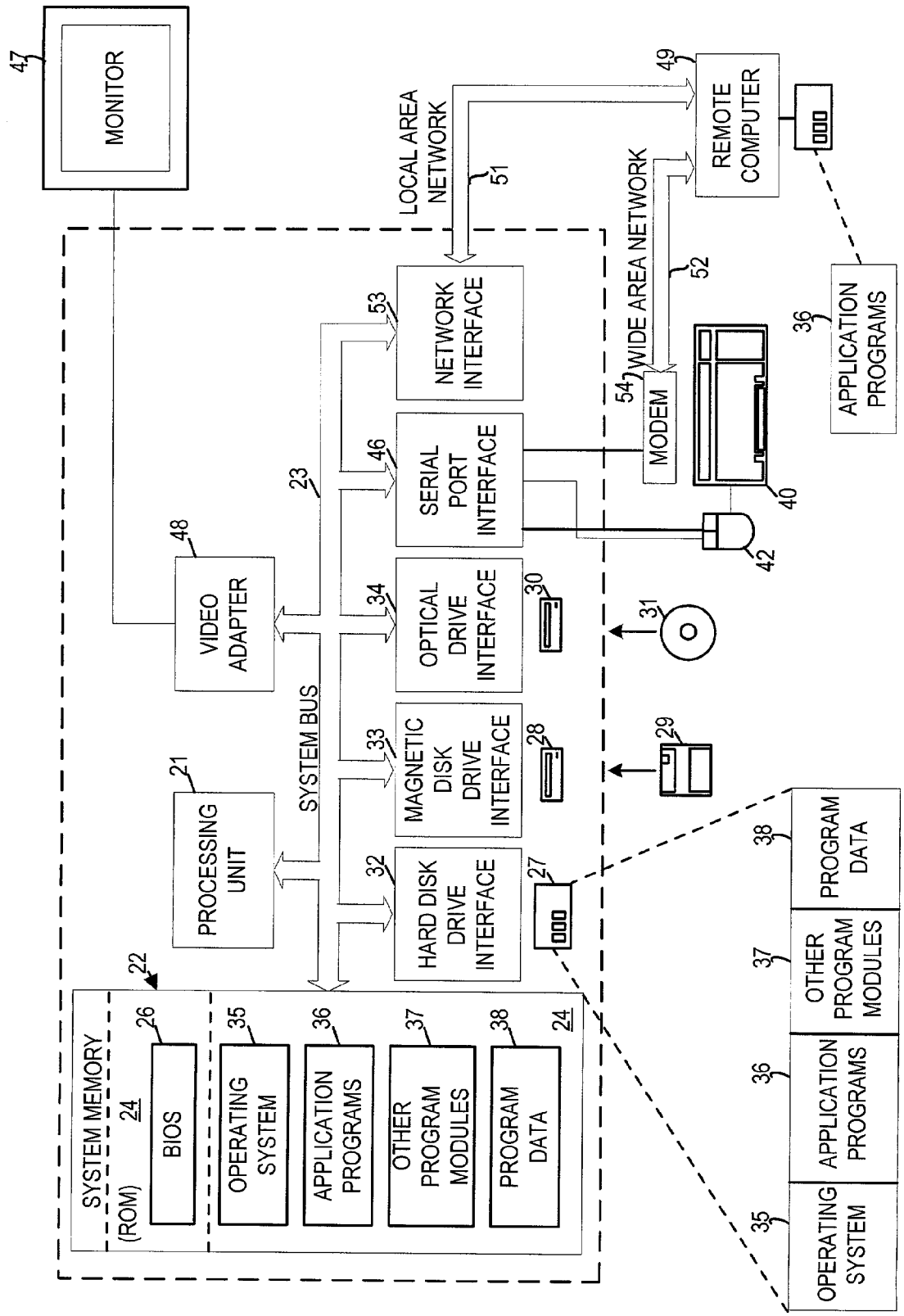
FIG. 4 illustrates an exemplary system useful for implementing an embodiment of the present invention.

The exemplary hardware and operating environment of FIG. 4 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 4. The logical connections depicted in FIG. 4 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, an optimizer of the present invention, including the optimization algorithm, optimization module, problem manager, and results cache may be incorporated as part of the operating system 35, application programs 36, or other program modules 37. The input data, simulation data, results cache data, and intermediate data associated with the optimization process may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

APPENDIX A

Exemplary XML Script Schema

```
- <Schema xmlns = "urn:schemas-microsoft-com:xml-data"
    xmlns:dt="urn:schemas-microsoft-com:datatypes">
  - <!--
      Top level elements: we need an objective function to minimi
      maximise, 0 or more constraints to fulfil, 1 or more input
```

APPENDIX A-continued

Exemplary XML Script Schema

```
      to substitute into the topology, 0 or variables which are al
      substituted into the topology, the topology and workload pa
      are gathered from the performance study.
    -->
  - <ElementType="optimisation_problem" content="altOnly"
      model="closed">
      <element type="objective" minOccurs="1" maxOccurs="1" />
      <element type="constraint" minOccurs="0" maxOccurs="*" />
      <element type="parameter" minOccurs="1" maxOccurs="*" />
      <element type="variable" minOccurs="0" maxOccurs="*" />
    </ElementType>
    <!-- Types of the above elements. -->
  - <ElementType name="objective" content="altOnly" model="closed">
      <attribute type="minmax" required="yes" />
      <element type="function" minOccurs="1" maxOccurs="1" />
    </ElementType>
  - <ElementType name="constraint" content="altOnly" order="seq"
      model="closed">
      <attribute type="constraint" required="yes" />
      <element type="function" minOccurs="1" maxOccurs="1" />
      <element type="function" minOccurs="1" maxOccurs="1" />
    </ElementTypes>
  - <ElementType name="parameter" content="altOnly" model="closed" >
      <attribute type="name" />
      <element type="value" minOccurs="1" maxOccurs="*" >
    </ElementTypes>
  - <ElementType name="variable" content="altOnly" model="closed" >
      <attribute type="name" />
      <element type="constantfunction" minOccurs="1" maxOccurs="1" />
    </ElementType>
    <ElementType name="topology" content="textOnly" model="closed" />
    <ElementType name="workload" content="textOnly" model="closed" />
    <ElementType name="value" content="textOnly" model="closed" />
    <!-- Types of attributes used above. -->
    <AttributeType name="name" dt:type="string" />
    <AttributeType name="minmax" dt:type="emumeration" dt:values="min
      max" />
    <AttributeType name="constraint" dt:type="enumeration"
      dt:values="le ge" />
    <!-- Function element type. -->
  - <ElementType name="function" content="altOnly" model="closed">
    - <group order="one">
      <element type="fconstant" />
      <element type="fstring" />
      <element type="frct" />
      <element type="fevent" />
      <element type="fparameter" />
      <element type="ftable" />
      <element type="binaryop" />
    </group>
    </ElementType>
  - <ElementType name="constantfunction"
      content="altOnly" model="closed">
    - <group order="one">
      <element type="fconstant" />
      <element type="tstring" />
      <element type="fparameter" />
      <element type="constanttable" />
      <element type="constantbinaryop" />
    </group>
    </ElementType>
    <!-- Sub-types of functions -->
    <ElementType name="fconstant" dt:type="float" content="textOnly"
      model="closed" />
    <ElementType name="fstring" dt:type="string" content=textOnly"
      model="closed" />
    <ElementType name="fparameter" dt:type="string" content="textOnly"
      model="closed" />
  - <ElementType name="ftable" content="altOnly" order="seq"
      model="closed">
      ><element type="function" minOccurs="1" maxOccurs="1" />
      <element type="stringpair" minOccurs="1" maxOccurs="*" />
    </ElementType>
  - <ElementType name="constanttable" content="altOnly" order="seq"
      model="closed">
      <element type="constantfunction" minOccurs="1" maxOccurs="1" />
      <element type="stringpair" minOccurs="1" maxOccurs="*" />
```

APPENDIX A-continued

Exemplary XML Script Schema

```
</ElementType>
- <ElementType name="frct" content="empty" model=closed">
    <attribute type="device" required="yes" />
    <attribute type="name" required="yes" />
    <attribute type="view" required="yes" />
    <!-- This is how we combine the means of the RCTs that match the
    device -->
    <attribute type="minmaxmean" required="yes" />
  </ElementType>
- <ElementType name="fevent" content="empty" model="closed">
    <attribute type="device" required="yes" />
    <attribute type="Interface_type" required="yes" />
    <attribute type="Interface_name" required="yes" />
    <attribute type="variable_name" required="yes" />
    <!-- This is how we combine the means of the event lists that match
    the device -->
    <attribute type="minmaxmean" required= yes" />
  </ElementType>
  <AttributeType name="device" dt:type="string" />
  <AttributeType name="view" dt:type="string" />
  <AttributeType name="Interface_type" dt:type="string" />
  <AttributeType name="Interface_name" dt:type="string" />
  <AttributeType name="variable_name" dt:type="string" />
  <AttributeType name="minmaxmean" dt:type="enumeration"
    dt:values="min max mean />
  <!-- Binary functions. -->
- <ElementType name="binaryop" content="altOnly" order="seq"
    model="closed">
    <attribute type="operation" required="yes" />
    <element type="function" minOccurs="1" maxOccurs="1" />
    <element type="function" minOccurs="1" maxOccurs="1" />
  </ElementType>
- <ElementType name="constantbinaryop" content="altOnly" order="seq"
    model="closed">
    <attribute type="operation" required="yes" />
    <element type="constantfunction" minOccurs="1" maxOccurs="1" />
    <element type="constantfunction" minOccurs="1" maxOccurs="1" />
  </ElementType>
  <AttributeType name="operation" dt:type="enumeration"
    dt:values="plus minus times divide" />
  <!-- For tables. -->
- <ElementType name="stringpair" content="empty" model="closed">
    <attribute type="key" required="yes" />
    <attribute type="value" required="yes" />
  </ElementType>
  <AttributeType name="key" dt:type="string" />
  <AttributeType name="value" dt:type="string" />
</Schema>
```

What is claimed is:

1. A computer program product encoding a computer program for executing on a computer system a computer process for optimizing a computer system configuration, the computer process comprising:

generating a candidate computer system configuration from a skeleton configuration and a set of one or more parameters that parameterize the skeleton configuration;

receiving simulation data generated by a performance simulator based on the candidate computer system configuration;

computing an objective based on one or more selected variables from the simulation data; and comparing the objective to a previously computed objective based on a previously simulated computer system configuration to yield an optimum configuration.

2. The computer program product of claim 1 wherein the computer process further comprises:

receiving a problem specification associated with the skeleton configuration, the problem specification defining an optimization function.

3. The computer program product of claim 2 wherein the problem specification further defines one or more constraint functions.

4. The computer program product of claim 3 wherein the one or more constraint functions are ordered by priority and, if neither the objective and the previously computed objective satisfy all of the one or more constraint functions, the comparing operation comprises:

identifying either the objective or the previously computed objective as a better solution based on whether the identified objective satisfies a higher priority constraint function.

5. The computer program product of claim 2 wherein the problem specification further defines one or more possible parameter values for at least one parameter.

6. The computer program product of claim 2 wherein the problem specification further defines one or more variable functions.

7. The computer program product of claim 3 wherein the one or more constraint functions are ordered by priority and, if neither the objective and the previously computed object satisfy all of the one or more constraint functions, the comparing operation comprises:

identifying either the objective or the previously computed objective as a better solution based on whether the identified objective satisfies a greater number of constraint functions.

8. The computer program product of claim 1 wherein the operation of generating a candidate computer system configuration comprises:

receiving the skeleton configuration having one or more parameter names, each parameter name being associated with a characteristic of the configuration; and generating the set of parameter values based on an optimization algorithm; and replacing each parameter name in the skeleton configuration with a corresponding parameter value to generate the candidate computer system configuration.

9. The computer program product of claim 8 wherein the operation of generating the set of parameter values comprises:

generating the set of parameters using a simplex search as the optimization algorithm.

10. The computer program product of claim 8 wherein the operation of generating the set of parameter values comprises:

generating the set of parameters using a response surface methodology as the optimization algorithm.

11. The computer program product of claim 1 wherein the operation of computing an objective comprises:

expressing interest in the selected variables; and receiving the selected variables after simulating the candidate computer system configuration, wherein the selected variables constitute a subset of the simulation results.

12. The computer program product of claim 11 wherein the interest is expressed though a simulator interface module.

13. The computer program product of claim 11 wherein the selected variables are received though a simulator interface module.

14. The computer program product of claim 1 wherein the operation of computing an objective comprises:

computing an optimization function result based on the selected variables received from the simulator interface module and an optimization function defined in a problem specification.

15. The computer program product of claim 1 wherein the operation of computing an objective comprises:
computing a constraint function result based on the one or more selected variables received from the simulator interface module and a constraint function defined in a problem specification.

16. A computer program product encoding a computer program for executing on a computer system a computer process for optimizing a computer system configuration, the computer process comprising:
generating a set of one or more parameters based on an optimization algorithm;
searching a results cache for an entry that matches the set of one or more parameters generated by the optimization algorithm;
receiving an objective based on the set of one or more parameters found in the results cache; and
comparing the objective to a previously computed objective based on a previous computer system configuration to yield an optimum configuration.

17. The computer program product of claim 16 wherein receiving operation comprises:
retrieving the objective from the matching entry in the results cache.

18. The computer program product of claim 16 wherein receiving operation comprises:
retrieving the values associated with the set of one or more parameters from the matching entry in the results cache; and
computing the objective based on the values retrieved from the results cache.

19. The computer program product of claim 16 wherein the results cache includes previously simulated results of multiple skeleton configurations.

20. A method of optimizing a computer system configuration, the method comprising:
generating a candidate computer system configuration from a skeleton configuration and a set of one or more parameters that parameterize the skeleton configuration;
receiving simulation data generated by a performance simulator based on the candidate computer system configuration;
computing an objective based on one or more selected variables from the simulation data; and
comparing the objective to a previously computed objective based on a previously simulated computer system configuration to yield an optimum configuration.

21. The method of claim 20 further comprising:
receiving a problem specification associated with the skeleton configuration, the problem specification defining an optimization function.

22. The method of claim 21 wherein the problem specification further defines one or more constraint functions.

23. The method of claim 22 wherein the one or more constraint functions are ordered by priority and, if neither the objective and the previously computed object satisfy all of the one or more constraint functions, the comparing operation comprises:
identifying one objective of the objective and the previously computed objective as a better solution based on whether the one objective satisfies a higher priority constraint function.

24. The method of claim 22 wherein the one or more constraint functions are ordered by priority and, if neither the objective and the previously computed object satisfy all of the one or more constraint functions, the comparing operation comprises:
identifying one objective of the objective and the previously computed objective as a better solution based on whether the one objective satisfies a greater number of constraint functions.

25. The method of claim 21 wherein the problem specification further defines one or more variable functions.

26. The method of claim 21 wherein the problem specification further defines one or more possible parameter values for at least one parameter.

27. The method of claim 20 wherein the operation of generating a candidate computer system configuration comprises:
receiving the skeleton configuration having one or more parameter names, each parameter name being associated with a characteristic of the configuration; and
generating the set of parameter values based on an optimization algorithm; and
replacing each parameter name in the skeleton configuration with a corresponding parameter value to generate the candidate computer system configuration.

28. The method of claim 27 wherein the operation of generating the set of parameter values comprises:
generating the set of parameters using a simplex search as the optimization algorithm.

29. The method of claim 27 wherein the operation of generating the set of parameter values comprises:
generating the set of parameters using a response surface methodology as the optimization algorithm.

30. The method of claim 20 wherein the operation of computing an objective comprises:
expressing interest in the selected variables; and
receiving the selected variables after simulating the candidate computer system configuration, wherein the selected variables constitute a subset of the simulation results.

31. The method of claim 30 wherein the interest is expressed through a simulator interface module.

32. The method of claim 30 wherein the selected variables are received through a simulator interface module.

33. The method of claim 20 wherein the operation of computing an objective comprises:
computing an optimization function result based on the selected variables received from the simulator interface module and an optimization function defined in a problem specification.

34. The method of claim 20 wherein the operation of computing an objective comprises:
computing a constraint function result based on the one or more selected variables received from the simulator interface module and a constraint function defined in a problem specification.

35. A method of optimizing a computer system configuration, the method comprising:
generating a set of one or more parameters based on an optimization algorithm;
searching a results cache for an entry that matches the set of one or more parameters generated by the optimization algorithm;
receiving an objective based on the set of one or more parameters found in the results cache; and
comparing the objective to a previously computed objective based on a previous computer system configuration to yield an optimum configuration.

36. The method of claim 35 wherein receiving operation comprises:
retrieving the objective from the matching entry in the results cache.

37. The method of claim 35 wherein receiving operation comprises:
retrieving the values associated with the set of one or more parameters from the matching entry in the results cache; and
computing the objective based on the values retrieved from the results cache.

38. The method of claim 35 wherein the results cache includes previously simulated results of multiple skeleton configurations.

39. A system for optimizing a computer system configuration, the system comprising:
an optimizing algorithm module generating a set of one or more parameters;
a problem manager generating a candidate computer system configuration from a skeleton configuration and the set of one or more parameters; and
a comparison module comparing an objective based on the candidate computer configuration to a previously computed objective based on a previously simulated computer system configuration to yield an optimum configuration.

40. The system of claim 39 further comprising:
a results cache providing the objective, wherein the objective is associated with a cached entry satisfying the set of one or more parameters.

41. The system of claim 39 further comprising:
a simulation interface providing simulation data from a performance simulator based on the candidate computer system configuration.

* * * * *